United States Patent
Kumar et al.

(10) Patent No.: US 9,414,067 B2
(45) Date of Patent: Aug. 9, 2016

(54) METHODS AND SYSTEMS FOR DETECTION OF BLOCK BASED VIDEO DROPOUTS

(71) Applicant: INTERRA SYSTEMS Inc., Cupertino, CA (US)

(72) Inventors: Bhupender Kumar, Haryana (IN); Shekhar Madnani, Uttar Pradesh (IN)

(73) Assignee: Interra Systems Inc., Cupertino, CA (US)

( * ) Notice: Subject to any disclaimer, the term of this patent is extended or adjusted under 35 U.S.C. 154(b) by 648 days.

(21) Appl. No.: 13/770,925

(22) Filed: Feb. 19, 2013

(65) Prior Publication Data

US 2014/0233648 A1    Aug. 21, 2014

(51) Int. Cl.
*H04N 7/26* (2006.01)
*H04N 19/89* (2014.01)

(52) U.S. Cl.
CPC ......... *H04N 19/00933* (2013.01); *H04N 19/89* (2014.11)

(58) Field of Classification Search
CPC .............................................. H04N 19/00933
See application file for complete search history.

(56) References Cited

U.S. PATENT DOCUMENTS

| | | | | |
|---|---|---|---|---|
| 6,295,089 B1* | 9/2001 | Hoang | | H04N 19/59 348/390.1 |
| 6,348,945 B1* | 2/2002 | Hayakawa | | H04N 9/8047 375/240.02 |
| 2004/0233991 A1* | 11/2004 | Sugimoto | | H04N 19/139 375/240.16 |
| 2008/0130750 A1* | 6/2008 | Song | | H04N 19/176 375/240.16 |
| 2009/0059084 A1* | 3/2009 | Okada | | G06T 3/4007 348/699 |

* cited by examiner

*Primary Examiner* — Dave Czekaj
*Assistant Examiner* — Berteau Joisil
(74) *Attorney, Agent, or Firm* — Next IP Law Group

(57) ABSTRACT

Methods and systems for detecting block based video dropouts in one or more fields associated with various video frames is provided. A current field is divided into a plurality of blocks. A set of activity blocks is identified from the plurality of blocks. The activity blocks are then processed to identify horizontal and vertical lines which are then further processed to form one or more candidate error blocks. The candidate error blocks are validated for start and end to determine a count of video dropout errors associated with the current field.

16 Claims, 9 Drawing Sheets

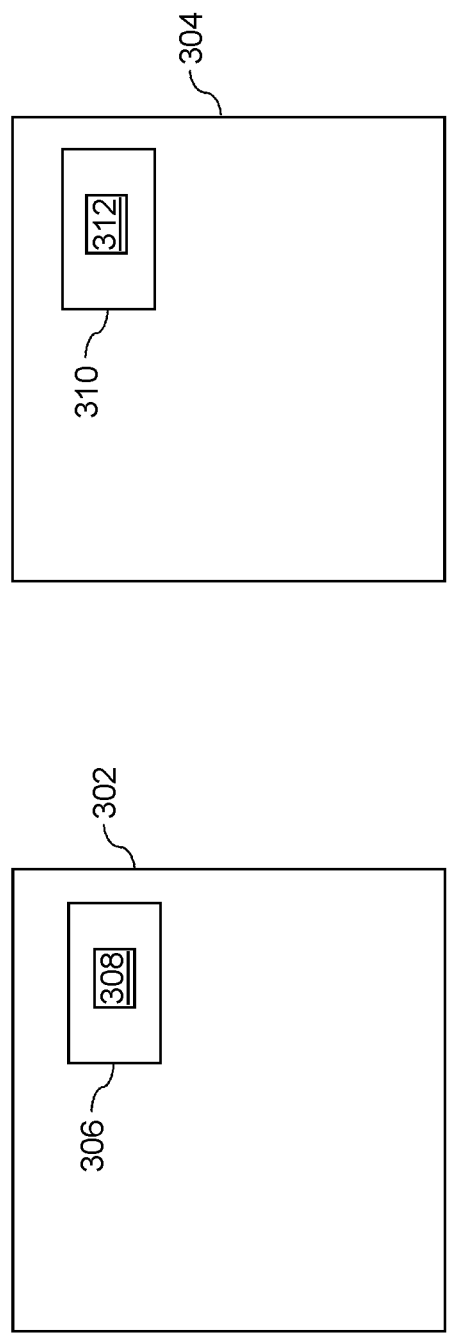

METHODS AND SYSTEMS FOR DETECTION OF BLOCK BASED VIDEO DROPOUTS

TECHNICAL FIELD

The present disclosure is generally related to detection of errors in digital video and, more particularly, is related to a methods and systems for detection of block based video dropouts.

BACKGROUND

Uncompressed Video in digital format requires large amount of storage space and data transfer bandwidth. Since a large requirement for storage space and data transfer bandwidth translates into an increase in video transmission and distribution costs, compression techniques have been developed to compress the video in a manner to minimize its size while maximizing its quality. Numerous intra- and interframe compression algorithms have been developed that compress multiple frames, that include frequency domain transformation of blocks within frames, motion vector prediction which reduces the temporal redundancy between the frames, entropy coding etc.

Interframe compression entails synthesizing subsequent images from a reference frame by the use of motion compensation. Motion compensation entails application of motion vector estimation algorithms, for example, block matching algorithm to identify temporal redundancy and differences in successive frames of a digital video sequence and storing the differences between successive frames along with an entire image of a reference frame, typically in a moderately compressed format. The differences between successive frames are obtained by comparing the successive frames with the reference frame which are then stored. Periodically, such as when a new video sequence is displayed, a new reference frame is extracted from the sequence, and subsequent comparisons are performed with this new reference frame. The interframe compression ratio may be kept constant while varying the video quality. Alternatively, interframe compression ratios may be content-dependent, i.e., if the video clip being compressed includes many abrupt scene transitions from one image to another, the compression is less efficient. Examples of video compression which use an interframe compression technique are Moving Picture Experts Group (MPEG), Data Converter Interface (DVI) and Indeo, among others.

Several of these interframe compression techniques, viz., MPEG, use block based video encoding that in turn utilizes Discrete Cosine Transform (DCT) based encoding. The DCT coefficients generated are scanned in zig-zag order and are entropy encoded using various schemes. In addition to encoding of spatial information of the successive frames, the temporal information of the successive frames in terms of motion vectors is also encoded using entropy based schemes. There are cases where the encoded stream is captured from a storage media device or through a transmission medium. Due to errors in capturing (such as reading from digital or analog tapes) or transmission medium (over wireless or lossy networks), bit-errors may be introduced that may lead to errors in decoding of captured or received encoded stream. This in turn leads to erroneous decoding of the DCT coefficients or the motion vectors. The error in a DC coefficient of a DCT block leads to formation of plain blocks (in constant background) which appear quite different from adjoining areas. However, if DCT AC coefficients are decoded incorrectly, the high frequency noise within blocks would appear. Further, with regards to temporal information, an incorrect decoding in motion vectors leads to incorrect motion compensation and hence misplaced blocks in the successive frames. Since, there is a drop of information, the above mentioned errors are termed as video dropouts. Several algorithms have been designed to detect the occurrence of the dropout error blocks but either they are inaccurate or they are extremely computation intensive.

In light of the above, there is a need for an invention that may enable detection of the video dropout that is accurate and is not computation intensive.

SUMMARY

Example embodiments of the present disclosure provide systems for detecting block based video dropouts. Briefly described, in architecture, one example embodiment of the system, among others, can be implemented as follows: an activity block identification module, a horizontal and vertical lines detection module, a candidate error block detection module, a memory module, a comparison module, and a start and end validation module.

Embodiments of the present disclosure can also be viewed as providing methods for detecting block based video dropouts. In this regard, one example embodiment of such a method, among others, can be broadly summarized by the following steps: identifying one or more activity blocks of the plurality of blocks that have the count of pixels greater than a second predetermined threshold; storing one or more location parameters of the one or more candidate error blocks corresponding to the current field in the form of a current candidate error block list; comparing the one or more location parameters of each candidate error block in the current candidate block list with one or more location parameters of each candidate error block detected in one or more fields processed previously stored in the form of the tracked candidate error block list; validating a start of appearance of a first candidate error block that is present in the current candidate error block list and absent in the tracked candidate error block list; and validating an end of appearance of a second candidate error block that is present in the tracked candidate error block list and absent in the current candidate error block list.

BRIEF DESCRIPTION OF THE DRAWINGS

FIG. 3 is a block diagram of reference and current template blocks, in accordance with an example embodiment of the present disclosure;

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

The present disclosure relates to detecting block based video dropouts in one or more fields associated with various video frames. The present disclosure discloses methods for processing one or more fields to detect occurrence of block based video dropouts. Identifying activity blocks in a field that is being currently processed and then processing the identified activity blocks further leads to saving of computation resources. In an example embodiment of the present disclosure, the detection of blocky dropouts can be performed during video transmission, video display, video transcoding, video post-processing, video quality testing and the like. In light of this, the example embodiments of the present disclosure, enable detection of block based video dropouts or dropout error blocks in a quick, accurate, and efficient manner.

Figure 1:
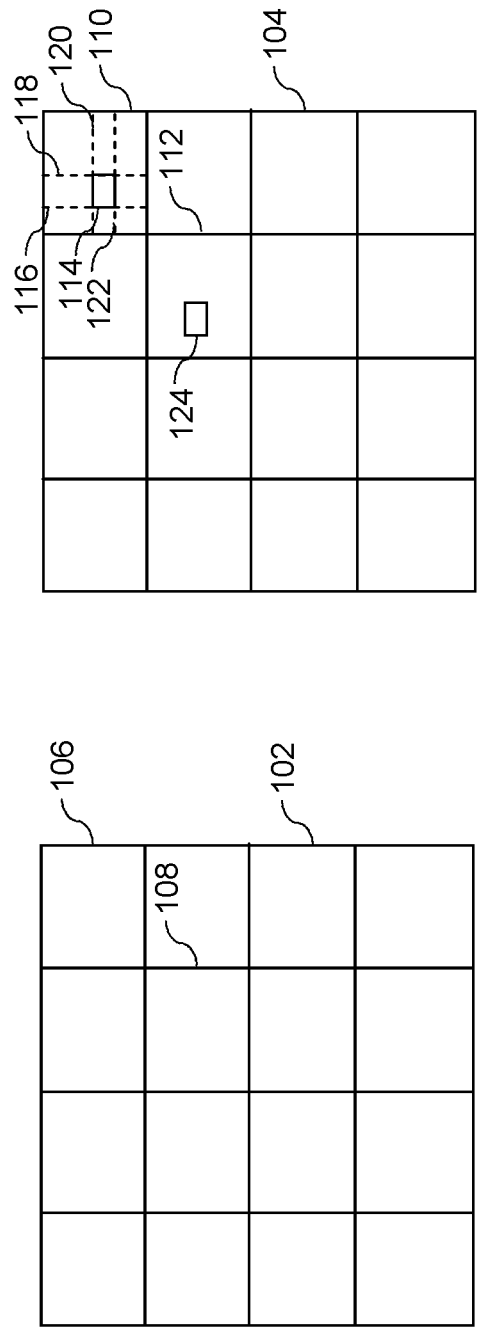
FIG. 1 is a block diagram of reference and current fields, in accordance with an example embodiment of the present disclosure.

Referring now to FIG. 1, a reference field 102 and a current field 104, in accordance with an example embodiment of the present disclosure is shown. Reference field 102 includes first and second blocks 106 and 108. Current field 104 includes third and fourth blocks 110 and 112. Third block 110 includes a first candidate error block 114, first and second vertical 116 and 118 and first and second horizontal lines 120 and 122. Fourth block 112 includes a second candidate error block 124.

Reference and current fields 102 and 104 are associated with a video frame that is a part of a video sequence encoded using one of the interframe compression codecs, for example, MPEG, DVI, and Indeo. Current field 104 is a field that is being processed in a current processing cycle of a system for detecting dropout error blocks and reference field 102 is a field that has a polarity identical to that of the current field 104 and was processed in a previous processing cycle of the system for detecting dropout error blocks. Reference and current fields 102 and 104 are divided into a plurality of blocks, for example, reference field 102 includes first and second blocks 106 and 108 and current field 104 includes third and fourth blocks 110 and 112. Each of first through fourth blocks 106-112 includes identical count of pixels, for example, length and width of each of the first through fourth blocks 106-112 may be 16 pixels. The system for detecting dropout error blocks executes various steps to identify occurrence of dropout error blocks in one or more fields, for example reference and current fields 102 and 104. Dropout error blocks are detected by forming one or more candidate error blocks, for example first and second candidate error blocks 114 and 124. Each of first and second candidate error blocks 114 and 124 are formed using vertical and horizontal lines, for example first candidate error block 114 is formed using first and second vertical lines 116 and 118 and first and second horizontal lines 120 and 122. The occurrence of the first and second candidate error blocks 114 and 124 is validated for either an end or start of occurrence of a dropout error block. The various steps entailing the detection of the dropout error block are described in detail in conjunction with FIGS. 2, 3, 4, 5A, 5B, and 5C.

Figure 2A:
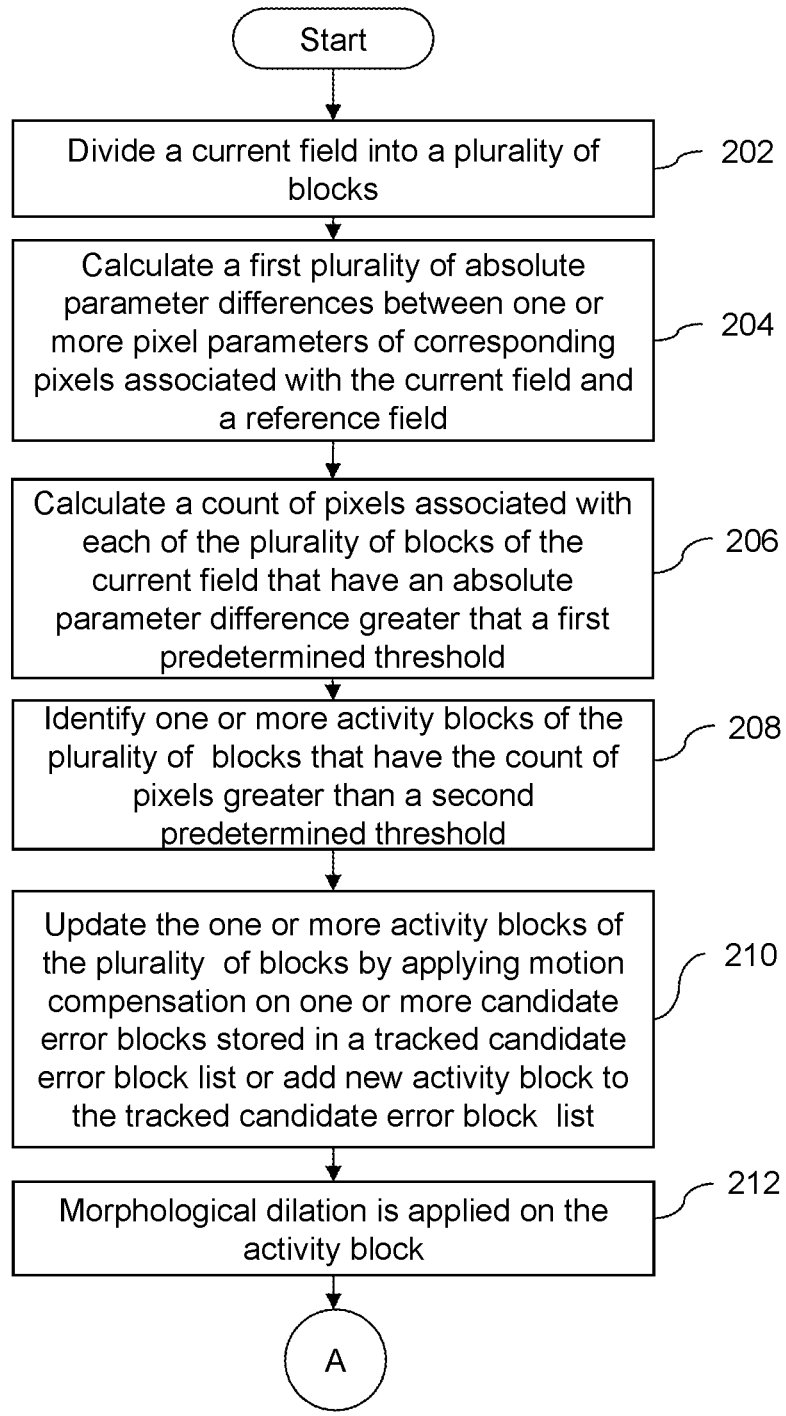
FIGS. 2A and 2B are a flow chart of a method for detecting one or more dropout error blocks, in accordance with an example embodiment of the present disclosure.
Figure 2B:
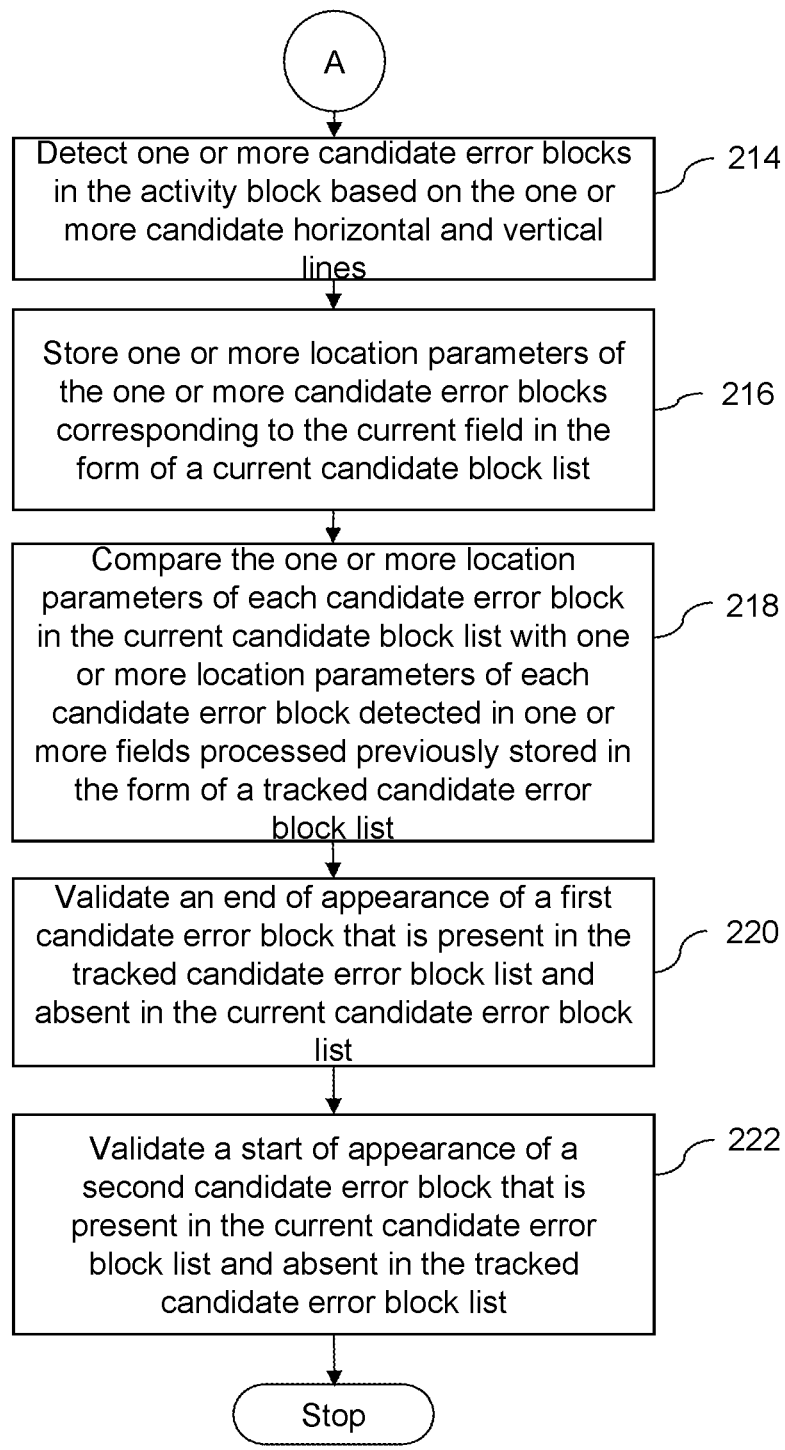

Referring now to FIGS. 2A and 2B, a flowchart of a method for detecting one or more dropout error blocks, in accordance with an example embodiment of the present disclosure is shown. FIGS. 2A and 2B will be explained in conjunction with FIG. 1.

In block 202, current field 104 is divided in a plurality of blocks, for example, third and fourth blocks 110 and 112. Each of the plurality of blocks includes a predetermined count of pixels. For example, of length and width of the third and fourth blocks 110 and 112 is 16 pixels then each of third and fourth blocks 110 and 112 will include 256 pixels each. In block 204, a first plurality of absolute parameter differences between one or more pixel parameters of corresponding pixels associated with current field 104 and reference field 102 is calculated. In an example embodiment of the present disclosure, the one or more pixel parameters include brightness code, colour code, contrast code, and the like. In block 206, a count of pixels associated with each of third and fourth blocks 110 and 112 that have an absolute parameter difference greater than a first predetermined threshold (TH) is calculated. In block 208, one or more activity blocks of the plurality of blocks that have the count of pixels greater than a second predetermined threshold (TH1) are identified. For example, third block 110 has the count of pixels greater than the second predetermined threshold and therefore is identified as an activity block. In block 210, the one or more of activity blocks, viz., third block 110, are updated by applying motion compensation on one or more candidate error blocks present in a tracked candidate error block list. Further, a new activity block may be added to current set of activity blocks. In an example embodiment of the present disclosure, the one or more candidate error blocks identified in previously processed fields are stored in a tracked candidate error block list. In block 212, morphological dilation is applied on the activity block, i.e., third block 110 to expand one or more shapes displayed in the video frame associated with current field 104 in a manner known to those of skill in the art. Since, morphological dilation is a known in the art procedure a detailed explanation has been excluded from the present description for the sake of brevity.

In block 214, one or more candidate error blocks, for example, candidate error block 114, in the activity block, i.e., third block 110, are detected by detecting one or more candidate vertical lines, for example, first and second candidate vertical lines 116 and 118 in the activity block. The first and second candidate vertical lines 116 and 118 are detected by comparing horizontal gradient values of the plurality of pixels associated with the activity block with a third predetermined threshold (TH2). In an example embodiment of the present disclosure, the first and second candidate vertical lines 116 and 118 are identified by traversing the activity block in a horizontal direction. Dilated horizontal gradient values are obtained by applying morphological dilation operation on the horizontal gradient values and subsequently, the first and second candidate vertical lines 116 and 118 are identified based on the horizontal gradient and dilated horizontal gradient values. In an example embodiment of the present disclosure, the first and second candidate vertical lines 116 and 118 are formed using one or more line pixels. The one or more line pixels are the pixels that have a high horizontal gradient value and a low dilated horizontal gradient value. The candidate vertical lines 116 and 118 are identified by selecting a first set of candidate vertical lines formed using the one or more lines pixels that have a length greater than a fourth predetermined threshold (TH3). The first set of candidate vertical lines is checked for clustering. If a pair of candidate vertical lines in the first set of candidate vertical lines is at a distance less than a fifth predetermined threshold (TH4) in horizontal direction and have a common region length greater than a sixth predetermined threshold (TH5), then the pair of candidate verticals are discarded from the first set of candidate vertical lines.

Further, one or more candidate horizontal lines, for example, first and second candidate horizontal lines 120 and 122 in the activity block. The first and second candidate horizontal lines 120 and 122 are detected by comparing vertical gradient values of the plurality of pixels associated with the activity block with the third predetermined threshold. In an example embodiment of the present disclosure, the first and second candidate horizontal lines 120 and 122 are identified by traversing the activity block in a vertical direction. Dilated vertical gradient values are obtained by applying morphological dilation operation on the vertical gradient values and subsequently, the first and second candidate horizontal lines 120 and 122 are identified based on the vertical gradient and dilated vertical gradient values. In an example embodiment of the present disclosure, the first and second candidate horizontal lines 120 and 122 are formed using one or more line pixels.

The one or more line pixels are the pixels that have a high vertical gradient value and a low dilated vertical gradient value. The candidate horizontal lines 120 and 122 are identified by selecting a first set of candidate horizontal lines formed using the one or more lines pixels that have a length greater than the fourth predetermined threshold TH3. The first set of candidate horizontal lines is checked for clustering. If a pair of candidate horizontal lines in the first set of candidate horizontal lines is at a distance less than the fifth predetermined threshold TH4 in horizontal direction and have a common region length greater than the sixth predetermined threshold TH5, then the pair of candidate horizontal lines are discarded from the first set of candidate horizontal lines. Subsequent to the identification of first and second candidate vertical and horizontal lines 116-120, candidate error block 114 is formed.

In block 216, location parameters corresponding to candidate error block 114 is stored in the form of a current candidate error block list. In an example embodiment of the present disclosure, the current candidate error block list is stored in a memory. In block 218, location parameters of each candidate error block in the current candidate block list are compared with location parameters of each candidate error block detected in the fields previously processed and stored in the form of the tracked candidate error block list. In block 220, an end of appearance of candidate error block 114 is validated, if candidate error block 114 (that is present in the tracked candidate error block list) is absent in the current candidate error block list. Validation of the end of appearance of candidate error block 114 is explained in detail in conjunction with FIGS. 4A, 4B, and 4C.

At step 222, a start of appearance of candidate error block 114 is validated, if candidate error block 114 (that is present in the current candidate error block list) is absent in the tracked candidate error block list. The method continues thereafter until an end of a video stream is reached. Validation of the start of appearance of candidate error block 114 is similar to the method of validating end of appearance of candidate error block 114 as explained in detail in conjunction with FIGS. 4A, 4B, and 4C. In an example embodiment of the present invention, candidate error block 114 may be present in both the current and tracked candidate error block lists. This situation implies neither the start nor the end of appearance of candidate error block 114 rather it implies that candidate error block 114 has continued to appear in the reference and current fields 102 and 104, respectively.

Referring now to FIG. 3, a block diagram of previous and current fields 302 and 304, in accordance with an example embodiment of the present disclosure is shown. Previous field 302 includes a candidate template block 306. Candidate template block 306 includes candidate error block 308. Current field 304 includes a reference template block 310. Reference template block 310 includes motion compensated error block 312.

Candidate error block 308 is identified in a manner similar to that described in conjunction with FIGS. 1 and 2. Candidate template block 306 further includes in addition to a first plurality of pixels associated with candidate error block 308, a second plurality of pixels within a predetermined distance from a third plurality of pixels associated with a boundary of the candidate error block 308. For example, if the predetermined distance is 5 pixels then candidate template block 306 will includes all the pixels are located within a distance of 5 pixels from edges of candidate error block 308 and outside of candidate error block 308. Reference template block 310 includes fourth and fifth pluralities of pixels associated with previous field 302 that was processed immediately before current field 304. The fourth plurality of pixels correspond in location to motion compensated locations of the first plurality of pixels located inside candidate error block 308 and the fifth plurality of pixels correspond in location to motion compensated locations of the second plurality of pixels. Motion compensation operation will be known to those of skill in the art and therefore has not been described in detail.

Figure 4A:
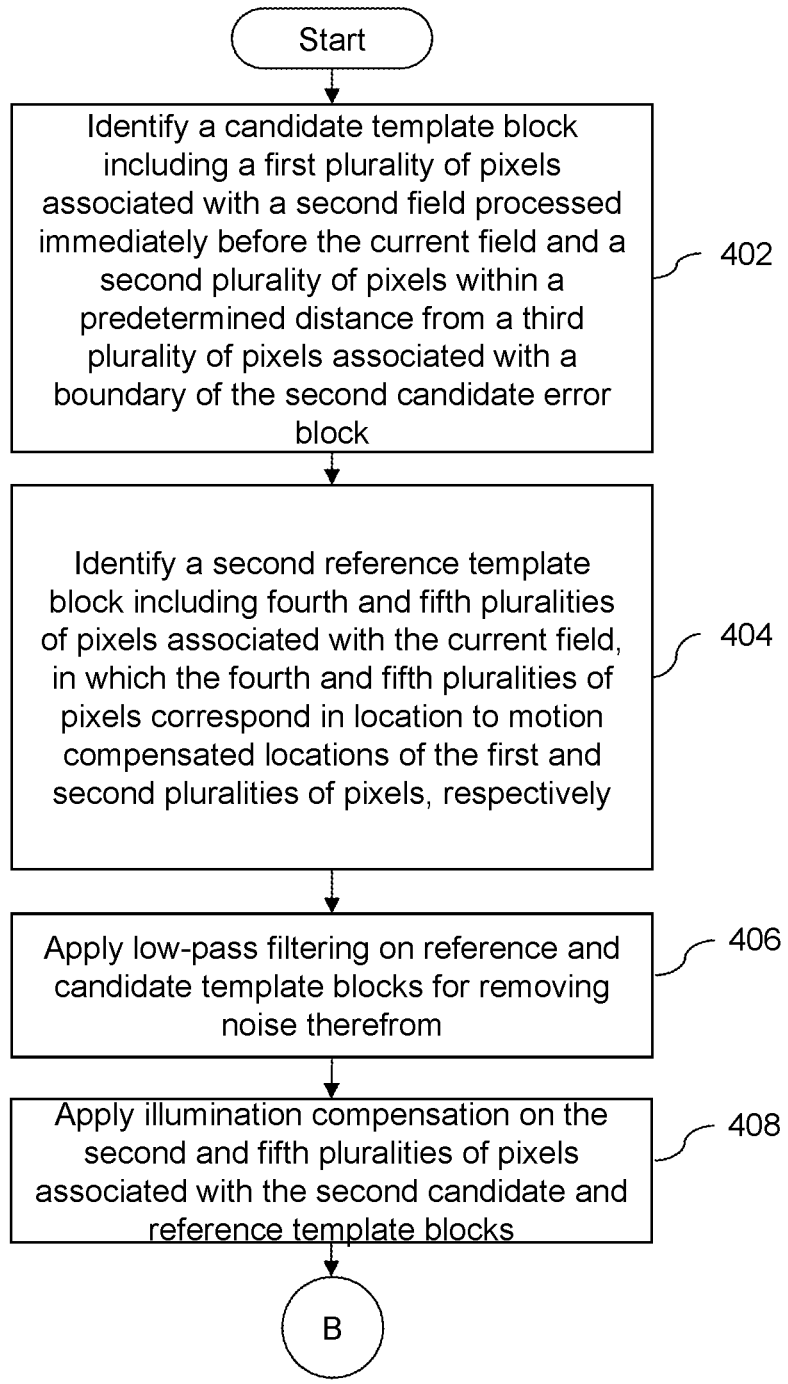
FIGS. 4A, 4B, and 4C are a flowchart of a method for validating end of appearance of an error candidate block, in accordance with an example embodiment of the present disclosure.
Figure 4B:
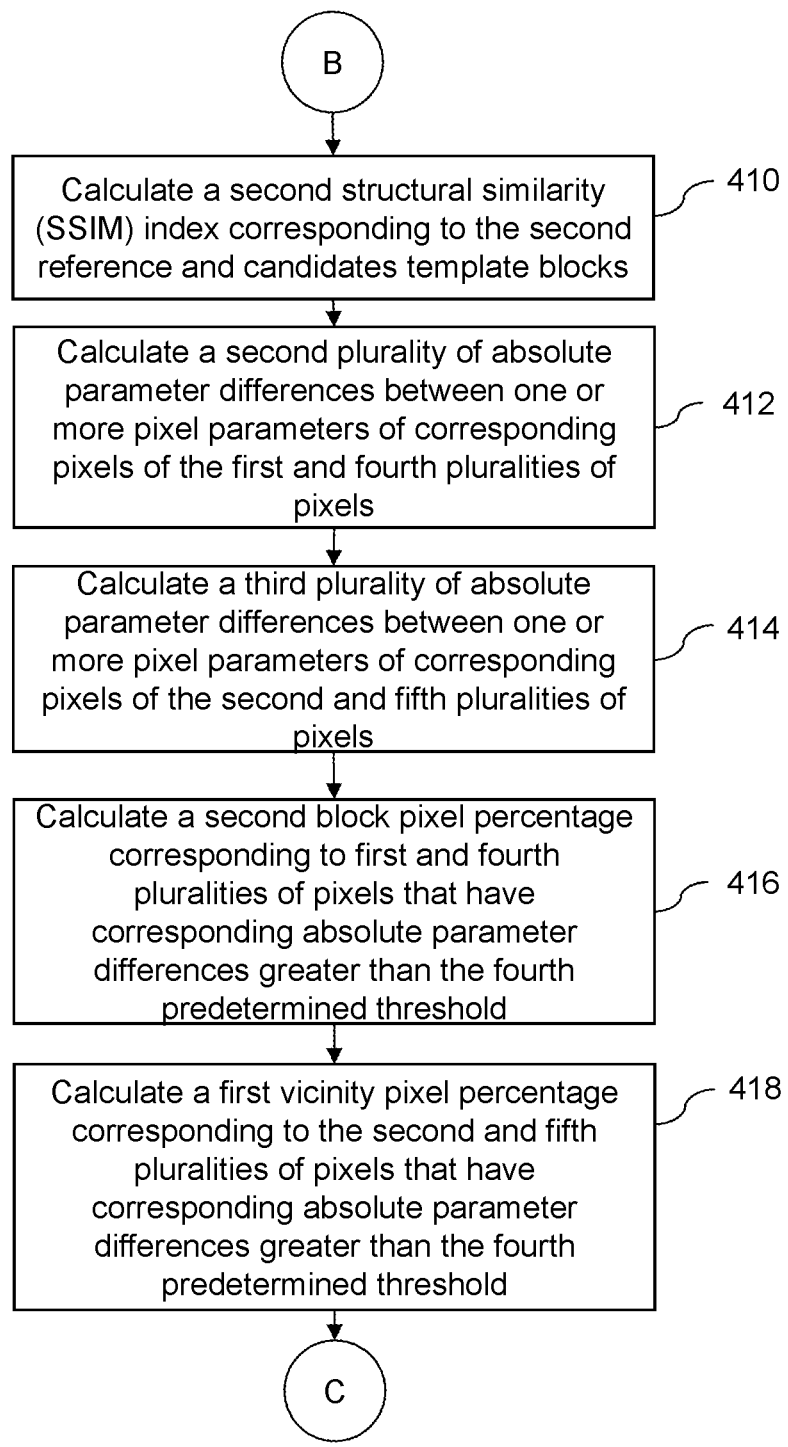
Figure 4C:
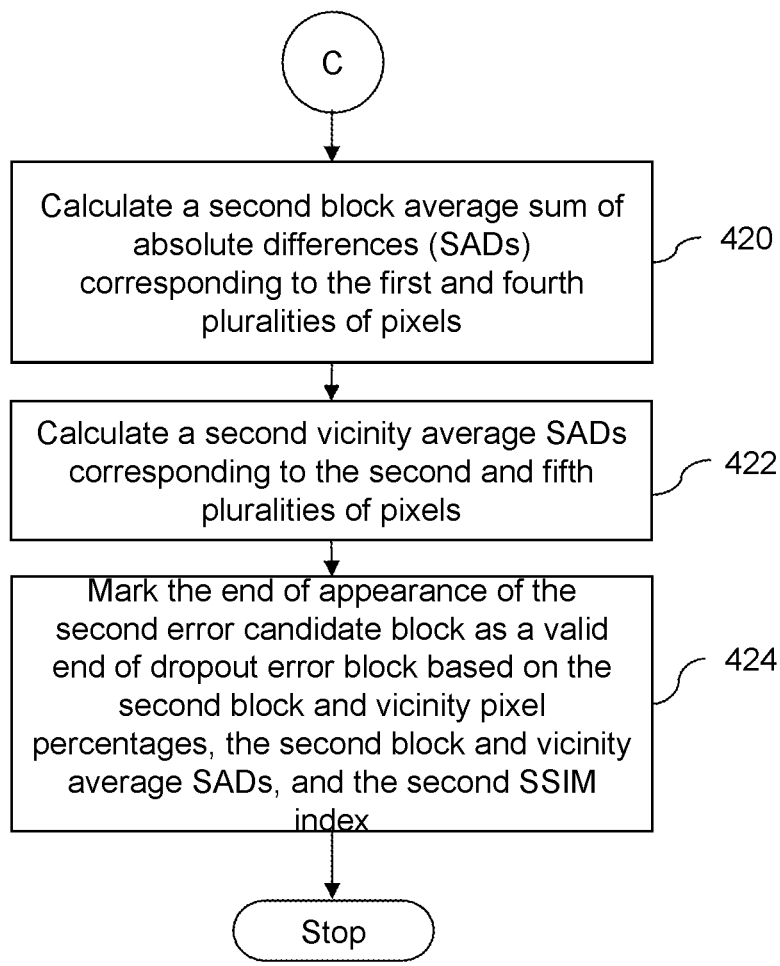

Referring now to FIGS. 4A, 4B, and 4C, a method for validating end of appearance of candidate error block, in accordance with an example embodiment of the present disclosure is shown. FIGS. 4A, 4B, and 4C will be explained in conjunction with FIGS. 1 and 3.

In block 402, candidate template block 306 is identified. Candidate template block 306 includes the first plurality of pixels associated with the candidate error block 308 and the second plurality of pixels within the predetermined distance from the third plurality of pixels associated with the boundary of candidate error block 308. In block 404, reference template block 310 including the fourth and fifth pluralities of pixels corresponding in location to motion compensated locations of the first and second pluralities of pixels, respectively is identified. In block 406, low-pass filtering is applied on reference and candidate template blocks 310 and 306 for removing noise therefrom. In an example embodiment of the present disclosure, low-pass filtering is applied by performing Gaussian blurring on pixels in the candidate and reference blocks 306 and 310 to remove noise. Since Gaussian blurring is a known in the art operation, a detailed explanation has been excluded for the sake of brevity. In block 408, illumination compensation is applied on the second and fifth pluralities of pixels associated with candidate and reference template blocks 306 and 310, respectively. The illumination compensation operation has been explained in detail in conjunction with FIG. 5. In block 410, a structural similarity (SSIM) index is calculated corresponding to candidate and reference template blocks 306 and 310. In block 412, a second plurality of absolute parameter differences between one or more pixel parameters of corresponding pixels of the first and fourth pluralities of pixels is calculated. In block 414, a third plurality of absolute parameter differences between one or more pixel parameters of corresponding pixels of the second and fifth pluralities of pixels is calculated. In block 416, a first block pixel percentage (PCDiffBlk) corresponding to the first and fourth pluralities of pixels that have corresponding absolute parameter differences greater than a seventh predetermined threshold (TH6) is calculated.

In block 418, a first vicinity pixel percentage (PCDiffSur) corresponding to the second and fifth pluralities of pixels that have corresponding absolute parameter differences greater than the seventh predetermined threshold TH6 is calculated.

In block 420, a first block average of absolute differences (MADBlk) corresponding to the first and fourth pluralities of pixels is calculated. In block 422, a first vicinity average of absolute differences (MADSur) corresponding to the second and fifth pluralities of pixels is calculated. In block 424, end of appearance of the candidate error block 308 is marked as a valid end of dropout error block based on the first block and vicinity pixel percentages PCDiffBlk and PCDiffSur, the first block and vicinity averages of absolute differences MADBlk and MADSur, and SSIM index. In an example embodiment of the present disclosure following condition (1) is evaluated and if the condition (1) is evaluated to be true, end of appearance of the candidate error block 308 is marked as valid.

$$(SSIM<=TH7) \text{ and } (PCDiffSur<=PCDiffBlk*TH8) \text{ and } (PCDiffBlk>=TH9) \text{ and } (MADBlk>=TH10) \text{ and } (MADSur<=TH11)) \quad (1)$$

Where:
TH7=eighth predetermined threshold;
TH8=ninth predetermined threshold;
TH9=tenth predetermined threshold;
TH10=eleventh predetermined threshold; and
TH11=twelfth predetermined threshold.

In an example embodiment of the present disclosure, the validation of the start of appearance of candidate error block 308 includes identifying candidate template block 306 from current field 302 instead from previous field 304 and identifying reference template block 308 from previous field 304 instead from current field 302. The remaining steps of validation remain identical to those of validation of the end of appearance of candidate error block 308.

Figure 5:
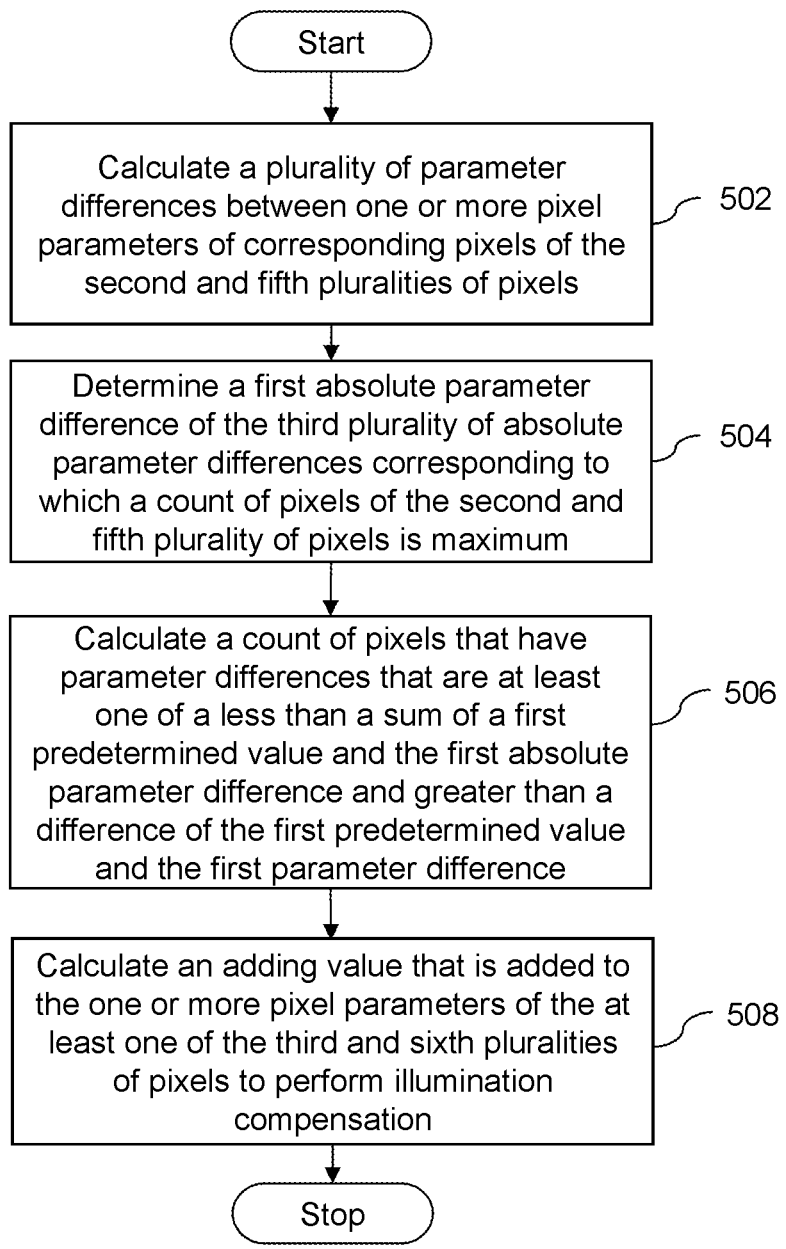
FIG. 5 is a flowchart of a method for performing illumination compensation, in accordance with an example embodiment of the present disclosure.

Referring now to FIG. 5, a method for performing illumination compensation in accordance with an example embodiment of the present disclosure is shown. FIG. 5 will be explained in conjunction with FIG. 3.

In block 502, a plurality of parameter differences between one or more pixel parameters of pixels associated with the second and fifth pluralities of pixels is calculated. In block 504, a first parameter difference (N) of the plurality of parameter differences corresponding to which a count of pixels (M) of the second and fifth pluralities of pixels is maximum is determined.

In block 506, a count of pixels (Y) that have parameter differences that are at least one of a less than a sum of a first predetermined value (P) and the first parameter difference N and greater than a difference of the first predetermined value P and the first parameter difference N. The above condition can be mathematically expressed as (2):

$$N-P<\text{Count of Pixels } Y<N+P \quad (2)$$

In block 508, an adding value (ADD_VAL) that is added to the one or more pixel parameters of the second and fifth pluralities of pixels to perform illumination compensation. The ADD_VAL is based on condition (3):

$$(ABS(N)>TH12) \text{ and } (Y/X>TH13) \quad (3)$$

Where:
X=Sum of counts of pixels in the second and fifth pluralities of pixels;
TH12=thirteenth predetermined threshold;
TH13=fourteenth predetermined threshold; and
ABS( )=Absolute value function
If condition (3) is true then ADD_VAL=ABS(N).

Figure 6:
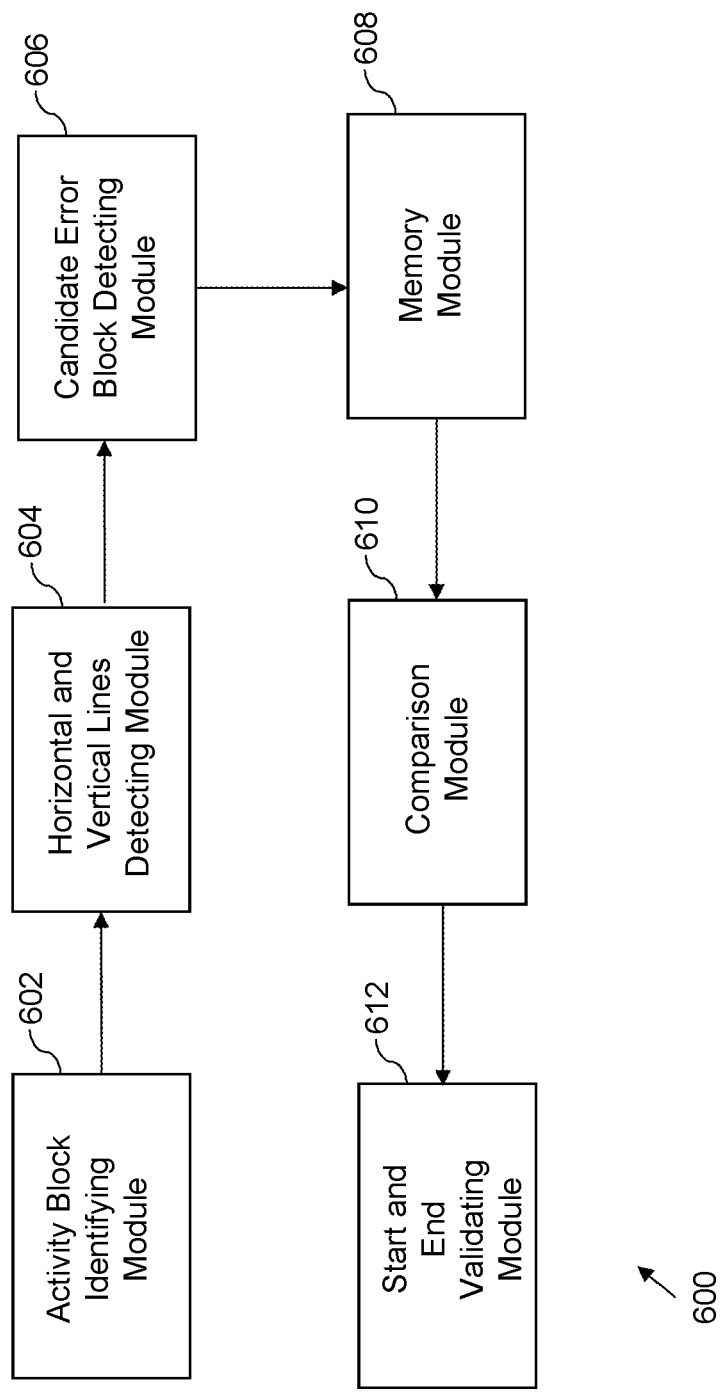
FIG. 6 is a block diagram of a system for detecting dropout error blocks, in accordance with an example embodiment of the present disclosure.

Referring now to FIG. 6, a block diagram of a system 600 for detecting dropout error blocks, in accordance with an example embodiment of the present disclosure is shown. In an example embodiment of the present disclosure, system 600 is a computing device such as computer, laptop, tablet, Embedded Processing System, Digital Signal Processing System and the like. System 600 includes an activity block identification module 602, a horizontal and vertical lines detection module 604, a candidate error block detection module 606, a memory module 608, a comparison module 610, and a start and end validation module 612. FIG. 6 will be explained in conjunction with FIGS. 1, and 3.

Activity block identification module 602 divides current field 104 into the plurality of blocks, for example, third and fourth blocks 110 and 112. The activity block identification module 602 then identifies one or more activity blocks based on the first plurality of absolute parameter differences between one or more pixel parameters of corresponding pixels associated with current field 104 and reference field 102. In an example embodiment of the present disclosure, the one or more pixel parameters include brightness code, colour code, contrast code, and the like. Activity block identification module 602 also identifies the one or more activity blocks based on the count of pixels associated with each of the plurality of blocks of current field 104 that have an absolute parameter difference greater than the first predetermined threshold TH, and the count of pixels greater than the second predetermined threshold TH1. Activity block identification module 602 then updates the one or more activity blocks of the plurality of blocks by applying motion compensation on one or more candidate error blocks stored in the tracked candidate error block list. In an example embodiment of the present disclosure, activity block identification module 602 stores the tracked candidate error block list in memory module 608. Additionally, activity block identification module 602 applies morphological dilation on the one or more activity blocks.

Horizontal and vertical lines detection module 604 detects first and second candidate horizontal lines 120 and 122 and first and second candidate vertical lines 116 and 118. Detection of first and second candidate vertical and horizontal lines 116-122 has been explained in detail in conjunction with FIGS. 2A and 2B. Candidate error block detection module 606 detects candidate error block 114 in the activity block, for example third block 110. Detection of candidate error block 114 has been explained in detail in conjunction with FIGS. 2A and 2B. Memory module 608 stores location parameters of the candidate error block corresponding to current field 104 in the form of the current candidate block list and location parameters of candidate error blocks identified corresponding to previously processed fields as the tracked candidate error block list.

Comparison module 610 compares the location parameters of each candidate error block, for example candidate error block 114, in the current candidate block list with location parameters of each candidate error block stored in the form of the tracked candidate error block list. Start and end validation module 612 validates start and end of appearance of candidate error block 114. Validation of start and end of appearance of candidate error block 114 has been described in detail in conjunction with FIGS. 4A, 4B, and 4C. In an example embodiment of the present disclosure, start and end validation module 612 determines a count of dropout error blocks in each of the plurality of fields and identifies one or more erroneous fields that have the count of candidate error blocks greater than the fifth predetermined threshold TH4.

The flow charts of FIGS. 2A, 2B, 4A, 4B, 4C, and FIG. 5 show the architecture, functionality, and operation of a possible implementation of detection of block based video dropout's software. In this regard, each block may represent a module, segment, or portion of code, which comprises one or more executable instructions for implementing the specified logical function(s). It should also be noted that in some alternative implementations, the functions noted in the blocks may occur out of the order noted in FIGS. 2A, 2B, 4A, 4B, 4C, and FIG. 5. For example, two blocks shown in succession in FIGS. 2A, 2B, 4A, 4B, 4C, and FIG. 5 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

The logic of the example embodiment(s) can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured mediums.

Although the present disclosure has been described in detail, it should be understood that various changes, substitutions and alterations may be made thereto without departing from the spirit and scope of the invention as defined by the appended claims.

What is claimed is:
1. A method for detecting one or more dropout error blocks in a plurality of fields, the plurality of fields associated with one or more video frames, the method comprising:
  detecting one or more candidate error blocks in each activity block of one or more activity blocks, comprising:
    detecting one or more candidate horizontal lines in each activity block of the one or more activity blocks, by
      determining vertical gradient values by calculating gradient values of pixels in vertical direction;
      determining dilated vertical gradient values by applying morphological dilation operation on the vertical gradient values;
      selecting one or more line pixels having vertical gradient value greater than a third predefined threshold and dilated vertical gradient values greater than a predefined threshold; and
      determining lines formed by using one or more line pixels having length greater than a fourth predetermined threshold;
    detecting one or more candidate vertical lines in each activity block of the one or more activity blocks, by
      determining horizontal gradient values by calculating gradient values of pixels in horizontal direction;
      determining dilated horizontal gradient values by applying morphological dilation operation on the horizontal gradient values;
      selecting one or more line pixels having horizontal gradient value greater than a third predefined threshold and dilated horizontal gradient values greater than a predefined threshold; and
      determining lines formed by using one or more line pixels having length greater than a fourth predetermined threshold;
    discarding pair of candidate vertical lines having distance between them less than fifth predefined threshold and having a common region length greater than a sixth predetermined threshold;
    discarding pair of candidate horizontal lines having distance between them less than fifth predefined threshold and having a common region length greater than a sixth predetermined threshold; and
    forming one or more candidate error blocks in the activity block based on pairs of one or more candidate horizontal lines and pairs of one or more candidate vertical lines;
  storing one or more location parameters of the one or more candidate error blocks corresponding to the current field in a current candidate error block list;
  comparing the one or more location parameters of each candidate error block in the current candidate block list with one or more location parameters of each candidate error block detected in one or more fields processed previously stored in the form of the tracked candidate error block list;
  validating a start of appearance of a first candidate error block that is present in the current candidate error block list and absent in the tracked candidate error block list, by
    determining a first candidate template block including a first plurality of pixels associated with the first candidate error block and a second plurality of pixels within a predetermined distance from a third plurality of pixels associated with a boundary of the first candidate error block;
    determining a first reference template block including fourth and fifth pluralities of pixels associated with a first field processed immediately before the current field, wherein the fourth plurality of pixels correspond in location to motion compensated locations of the first plurality of pixels and the fifth plurality of pixels correspond in location to motion compensated locations of the second plurality of pixels; and validating the start of appearance of a first candidate error block if the first plurality of pixels is not similar to the fourth plurality of pixels and the second plurality of pixels is similar to the fifth plurality of pixels;

validating an end of appearance of a second candidate error block that is present in the tracked candidate error block list and absent in the current candidate error block list, by determining a second candidate template block including a sixth plurality of pixels associated with a second field processed immediately before the current field and a seventh plurality of pixels within a predetermined distance from an eighth plurality of pixels associated with a boundary of the second candidate error block;

determining a second reference template block including ninth and tenth pluralities of pixels associated with the current field, wherein the ninth plurality of pixels correspond in location to motion compensated locations of the sixth plurality of pixels and the tenth plurality of pixels correspond in location to motion compensated locations of the seventh plurality of pixels; and validating the end of appearance of a second candidate error block if the sixth plurality of pixels is not similar to the ninth plurality of pixels and the seventh plurality of pixels is similar to the tenth plurality of pixels.

2. The method of claim 1, wherein validating the start of appearance of the first candidate error block that is present in the current candidate error block list and absent in the tracked candidate error block list comprises:

applying low-pass filtering on the first reference and candidate template blocks for removing noise therefrom;

applying illumination compensation on the second and fifth pluralities of pixels associated with the first candidate and reference template blocks;

calculating a first index corresponding to a structural similarity of the first reference and candidates template blocks;

calculating a second plurality of absolute parameter differences between one or more pixel parameters of corresponding pixels of the first and fourth pluralities of pixels;

calculating a third plurality of absolute parameter differences between one or more pixel parameters of corresponding pixels of the second and fifth pluralities of pixels;

calculating a first block pixel percentage corresponding to the first and fourth pluralities of pixels that have corresponding absolute parameter differences greater than a fourth predetermined threshold;

calculating a first vicinity pixel percentage corresponding to the second and fifth pluralities of pixels that have corresponding absolute parameter differences greater than the fourth predetermined threshold;

calculating a first block average of absolute differences corresponding to the first and fourth pluralities of pixels;

calculating a first vicinity average of absolute differences corresponding to the second and fifth pluralities of pixels; and marking the start of appearance of the first error candidate block as a valid start of dropout error block based on the first block and vicinity pixel percentages, the first block and vicinity averages of absolute differences, and the first index.

3. The method of claim 2, wherein applying illumination compensation on the second and fifth pluralities of pixels associated with the first candidate and reference template blocks comprises:

calculating a plurality of parameter differences between one or more pixel parameters of corresponding pixels of the second and fifth pluralities of pixels;

determining a first parameter difference of the plurality of parameter differences corresponding to which a count of pixels of the second and fifth pluralities of pixels is maximum;

calculating a count of pixels that have parameter differences that are at least one of a less than a sum of a first predetermined value and the first parameter difference and greater than a difference of the first predetermined value and the first parameter difference; and calculating an adding value that is added to the one or more pixel parameters of the at least one of the second and fifth pluralities of pixels to perform illumination compensation, the adding value corresponds to a first parameter difference corresponding to which a count of pixels of the second and fifth pluralities of pixels is maximum when, an absolute value of the first parameter difference is greater than a thirteenth predetermined threshold, and a ratio of a count of pixels that have parameter differences that are at least one of:

less than a sum of a first predetermined value and the first parameter difference and greater than a difference of the first predetermined value and the first parameter difference, and sum of counts of pixels in the second and fifth pluralities of pixels greater than a fourteenth predetermined threshold.

4. The method of claim 1, wherein validating the end of appearance of the second candidate error block that is present in the tracked candidate error block list and absent in the current candidate error block list comprises:

applying low-pass filtering on the second reference and candidate template blocks for removing noise therefrom;

applying illumination compensation on the seventh and tenth pluralities of pixels associated with the second candidate and reference template blocks;

calculating a second index corresponding to a structural similarity of the second reference and candidates template blocks;

calculating a fourth plurality of absolute parameter differences between one or more pixel parameters of corresponding pixels of the sixth and ninth pluralities of pixels;

calculating a fifth plurality of absolute parameter differences between one or more pixel parameters of corresponding pixels of the seventh and tenth pluralities of pixels;

calculating a second block pixel percentage corresponding to the sixth and ninth pluralities of pixels that have corresponding absolute parameter differences greater than the fourth predetermined threshold;

calculating a first vicinity pixel percentage corresponding to the seventh and tenth pluralities of pixels that have corresponding absolute parameter differences greater than the fourth predetermined threshold;

calculating a second block average of absolute differences corresponding to the sixth and ninth pluralities of pixels;

calculating a second vicinity average of absolute differences corresponding to the seventh and tenth pluralities of pixels; and marking the end of appearance of the second error candidate block as a valid end of dropout error block based on the second block and vicinity pixel percentages, the second block and vicinity averages of absolute differences, and the second index.

5. The method of claim 1 further comprising:

determining a count of dropout error blocks in each of the plurality of fields; and identifying one or more erroneous fields that have the count of candidate error blocks greater than a fifth predetermined threshold.

6. A system for detecting dropout error blocks in a plurality of fields, the plurality of fields associated with one or more video frames, the system comprising:

a horizontal and vertical lines detection module for detecting one or more candidate horizontal lines in each activity block of one or more activity blocks, by determining vertical gradient values by calculating gradient values of pixels in vertical direction;

determining dilated vertical gradient values by applying morphological dilation operation on the vertical gradient values;

selecting one or more line pixels having vertical gradient value greater than a third predefined threshold and dilated vertical gradient values greater than a predefined threshold;

determining lines formed by using one or more line pixels having length greater than a fourth predetermined threshold; and discarding pair of candidate vertical lines having distance between them less than fifth predefined threshold and having a common region length greater than a sixth predetermined threshold; and detecting one or more candidate vertical lines in each activity block of the one or more activity blocks, by determining horizontal gradient values by calculating gradient values of pixels in horizontal direction;

determining dilated horizontal gradient values by applying morphological dilation operation on the horizontal gradient values:

selecting one or more line pixels having horizontal gradient value greater than a third predefined threshold and dilated horizontal gradient values greater than a predefined threshold;

determining lines formed by using one or more line pixels having length greater than a fourth predetermined threshold; and discarding pair of candidate horizontal lines having distance between them less than fifth predefined threshold and having a common region length greater than a sixth predetermined threshold;

a candidate error block detection module for detecting the one or more candidate error blocks in the activity block based on pairs of one or more candidate horizontal lines and pairs of one or more candidate vertical lines;

a memory module for storing one or more location parameters of the one or more candidate error blocks corresponding to the current field a current candidate block list;

a comparison module for comparing the one or more location parameters of each candidate error block in the current candidate block list with one or more location parameters of each candidate error block detected in one or more fields processed previously stored in the form of the tracked candidate error block list; and a start and end validation module for validating a start of appearance of a first candidate error block that is present in the current candidate error block list and absent in the tracked candidate error block list, by determining a first candidate template block including a first plurality of pixels associated with the first candidate error block and a second plurality of pixels within a predetermined distance from a third plurality of pixels associated with a boundary of the first candidate error block;

determining a first reference template block including fourth and fifth pluralities of pixels associated with a first field processed immediately before the current field, wherein the fourth plurality of pixels correspond in location to motion compensated locations of the first plurality of pixels and the fifth plurality of pixels correspond in location to motion compensated locations of the second plurality of pixels; and validating the start of appearance of a first candidate error block if the first plurality of pixels is not similar to the fourth plurality of pixels and the second plurality of pixels is similar to the fifth plurality of pixels; and validating an end of appearance of a second candidate error block that is present in the tracked candidate error block list and absent in the current candidate error block list, by determining a second candidate template block including a sixth plurality of pixels associated with a second field processed immediately before the current field and a seventh plurality of pixels within a predetermined distance from an eighth plurality of pixels associated with a boundary of the second candidate error block;

determining a second reference template block including ninth and tenth pluralities of pixels associated with the current field, wherein the ninth plurality of pixels correspond in location to motion compensated locations of the sixth plurality of pixels and the tenth plurality of pixels correspond in location to motion compensated locations of the seventh plurality of pixels; and validating the end of appearance of a second candidate error block if the sixth plurality of pixels is not similar to the ninth plurality of pixels and the seventh plurality of pixels is similar to the tenth plurality of pixels.

7. The system of claim 6, wherein the start and end validation module further performs steps comprising:

applying low-pass filtering on the first reference and candidate template blocks for removing noise therefrom;

applying illumination compensation on the second and fifth pluralities of pixels associated with the first candidate and reference template blocks;

calculating a first index corresponding to a structural similarity of the first reference and candidates template blocks;

calculating a second plurality of absolute parameter differences between one or more pixel parameters of corresponding pixels of the first and fourth pluralities of pixels;

calculating a third plurality of absolute parameter differences between one or more pixel parameters of corresponding pixels of the second and fifth pluralities of pixels;

calculating a first block pixel percentage corresponding to the first and fourth pluralities of pixels that have corresponding absolute parameter differences greater than a fourth predetermined threshold;

calculating a first vicinity pixel percentage corresponding to the second and fifth pluralities of pixels that have corresponding absolute parameter differences greater than the fourth predetermined threshold;

calculating a first block average of absolute differences corresponding to the first and fourth pluralities of pixels;

calculating a first vicinity average of absolute differences corresponding to the second and fifth pluralities of pixels; and marking the start of appearance of the first error candidate block as a valid start of dropout error block based on the first block and vicinity pixel percentages, the first block and vicinity averages of absolute differences, and the first index.

8. The system of claim 6, wherein the start and end validation module further performs steps comprising:

applying low-pass filtering on the second reference and candidate template blocks for removing noise therefrom;

applying illumination compensation on the eighth and eleventh pluralities of pixels associated with the second candidate and reference template blocks;

calculating a second index corresponding to a structural similarity of the second reference and candidates template blocks;

calculating a fourth plurality of absolute parameter differences between one or more pixel parameters of corresponding pixels of the seventh and tenth pluralities of pixels;

calculating a fifth plurality of absolute parameter differences between one or more pixel parameters of corresponding pixels of the eighth and eleventh pluralities of pixels;

calculating a second block pixel percentage corresponding to the seventh and tenth pluralities of pixels that have corresponding absolute parameter differences greater than the fourth predetermined threshold;

calculating a first vicinity pixel percentage corresponding to the eight and eleventh pluralities of pixels that have corresponding absolute parameter differences greater than the fourth predetermined threshold;

calculating a second block average of absolute differences corresponding to the seventh and tenth pluralities of pixels;

calculating a second vicinity average of absolute differences corresponding to the eighth and eleventh pluralities of pixels; and marking the end of appearance of the second error candidate block as a valid end of dropout error block based on the second block and vicinity pixel percentages, the second block and vicinity averages of absolute differences, and the second index.

9. The system of claim 6, wherein the start and end validation module further performs steps comprising:

calculating a plurality of parameter differences between one or more pixel parameters of corresponding pixels of the second and fifth pluralities of pixels;

determining a first parameter difference of the plurality of parameter differences corresponding to which a count of pixels of the second and fifth pluralities of pixels is maximum;

calculating a count of pixels that have parameter differences that are at least one of a less than a sum of a first predetermined value and the first parameter difference and greater than a difference of the first predetermined value and the first parameter difference; and calculating an adding value that is added to the one or more pixel parameters of the at least one of the second and fifth pluralities of pixels to perform illumination compensation, the adding value corresponds to a first parameter difference corresponding to which a count of pixels of the second and fifth pluralities of pixels is maximum when, an absolute value of the first parameter difference is greater than a thirteenth predetermined threshold, and a ratio of a count of pixels that have a parameter differences that are at least one of:

less than a sum of a first predetermined value and the first parameter difference and greater than a difference of the first predetermined value and the first parameter difference, and sum of counts of pixels in the second and fifth pluralities of pixels greater than a fourteenth predetermined threshold.

10. The system of claim 9, wherein the start and end validation module further performs the steps comprising:

determining a count of dropout error blocks in each of the plurality of fields; and identifying one or more erroneous fields that have the count of candidate error blocks greater than a fifth predetermined threshold.

11. A computer program product comprising computer executable instructions embodied in a non-transitory computer-readable medium for use in connection with a processor-containing system, for executing steps comprising:

detecting one or more candidate error blocks in each activity block of one or more activity blocks, comprising:

detecting one or more candidate horizontal lines in each activity block of the one or more activity blocks, by determining vertical gradient values by calculating gradient values of pixels in vertical direction;

determining dilated vertical gradient values by applying morphological dilation operation on the vertical gradient values;

selecting one or more line pixels having vertical gradient value greater than a third predefined threshold and dilated vertical gradient values greater than a predefined threshold; and determining lines formed by using one or more line pixels having length greater than a fourth predetermined threshold;

detecting one or more candidate vertical lines in each activity block of the one or more activity blocks, by determining horizontal gradient values by calculating gradient values of pixels in horizontal direction;

determining dilated horizontal gradient values by applying morphological dilation operation on the horizontal gradient values;

selecting one or more line pixels having horizontal gradient value greater than a third predefined threshold and dilated horizontal gradient values greater than a predefined threshold; and determining lines formed by using one or more line pixels having length greater than a fourth predetermined threshold;

discarding pair of candidate vertical lines having distance between them less than fifth predefined threshold and having a common region length greater than a sixth predetermined threshold;

discarding pair of candidate horizontal lines having distance between them less than fifth predefined threshold and having a common region length greater than a sixth predetermined threshold; and forming one or more candidate error blocks in the activity block based on pairs of candidate horizontal and vertical lines;

storing one or more location parameters of the one or more candidate error blocks corresponding to the current field in a current candidate error block list;

comparing the one or more location parameters of each candidate error block in the current candidate block list with one or more location parameters of each candidate error block detected in one or more fields processed previously stored in the form of the tracked candidate error block list;

validating a start of appearance of a first candidate error block that is present in the current candidate error block list and absent in the tracked candidate error block list, by determining a first candidate template block including a first plurality of pixels associated with the first candidate error block and a second plurality of pixels within a predetermined distance from a third plurality of pixels associated with a boundary of the first candidate error block;

determining a first reference template block including fourth and fifth pluralities of pixels associated with a first field processed immediately before the current field, wherein the fourth plurality of pixels correspond in location to motion compensated locations of the first plurality of pixels and the fifth plurality of pixels correspond in location to motion compensated locations of the second plurality of pixels; and validating the start of appearance of a first candidate error block if the first plurality of pixels is not similar to the fourth plurality of pixels and the second plurality of pixels is similar to the fifth plurality of pixels;

validating an end of appearance of a second candidate error block that is present in the tracked candidate error block list and absent in the current candidate error block list, by determining a second candidate template block including a sixth plurality of pixels associated with a second field processed immediately before the current field and a seventh plurality of pixels within a predetermined distance from an eighth plurality of pixels associated with a boundary of the second candidate error block;

determining a second reference template block including ninth and tenth pluralities of pixels associated with the current field, wherein the ninth plurality of pixels correspond in location to motion compensated locations of the sixth plurality of pixels and the tenth plurality of pixels correspond in location to motion compensated locations of the seventh plurality of pixels; and validating the end of appearance of a second candidate error block if the sixth plurality of pixels is not similar to the ninth plurality of pixels and the seventh plurality of pixels is similar to the tenth plurality of pixels.

12. The method of claim 2, wherein the start of appearance of the first error candidate block is marked if the first index is less than or equal to an eighth predetermined threshold, and the first vicinity pixel percentage is less than or equal to a product of the first block pixel percentage and a ninth predetermined threshold, and the first block pixel percentage is greater than or equal to a tenth predetermined threshold, and the first block average of absolute differences is greater than or equal to an eleventh predetermined threshold, and the first vicinity average of absolute differences is less than or equal to a twelfth predetermined threshold.

13. The method of claim 4, wherein the end of appearance of the second error candidate block is marked if the second index is less than or equal to an eighth predetermined threshold, and the first vicinity pixel percentage is less than or equal to a product of the second block pixel percentage and a ninth predetermined threshold, and the second block pixel percentage is greater than or equal to tenth predetermined threshold, and the second block average of absolute differences is greater than or equal to an eleventh predetermined threshold, and the second vicinity average of absolute differences is less than or equal to a twelfth predetermined threshold.

14. The method of claim 1, wherein the one or more activity blocks are determined by dividing a current field into a plurality of blocks;

calculating a first plurality of absolute parameter differences between one or more pixel parameters of corresponding pixels associated with the current field and a reference field;

calculating a count of pixels associated with each of the plurality of blocks of the current field that have and absolute parameter difference greater than a first predetermined threshold; and identifying one or more activity blocks of the plurality of blocks that have the count of pixels greater than a second predetermined threshold.

15. The method of claim 14, wherein the one or more activity blocks are updated by applying motion compensation on one or more candidate error blocks stored in a tracked candidate error block list; and applying morphological dilation operation on the one or more activity blocks.

16. The system of claim 6, further comprising an activity block identification module for performing steps comprising:

dividing a current field into a plurality of blocks;

calculating a first plurality of absolute parameter differences between one or more pixel parameters of corresponding pixels associated with the current field and a reference field;

calculating a count of pixels associated with each of the plurality of blocks of the current field that have an absolute parameter difference greater than a first predetermined threshold;

identifying one or more activity blocks of the plurality of blocks that have the count of pixels greater than s second predetermined threshold;

updating the one or more activity blocks of the plurality of blocks by applying motion compensation on one or more candidate error blocks stored in a tracked candidate error block list; and applying morphological dilation operation on the one or more activity blocks.

* * * * *